United States Patent
Reif et al.

(10) Patent No.: US 9,475,060 B2
(45) Date of Patent: Oct. 25, 2016

(54) METHOD FOR DISINTEGRATING AN ELASTOMER AND DISINTEGRATOR

(75) Inventors: Lothar Reif, Dormagen (DE); Thomas Neuner, Hilden (DE); Christian Mähner-Wolfarth, Dormagen (DE); Werner Obrecht, Moers (DE)

(73) Assignee: LANXESS DEUTSCHLAND GMBH, Köln (DE)

( * ) Notice: Subject to any disclaimer, the term of this patent is extended or adjusted under 35 U.S.C. 154(b) by 385 days.

(21) Appl. No.: 14/122,760

(22) PCT Filed: May 29, 2012

(86) PCT No.: PCT/EP2012/060021
§ 371 (c)(1),
(2), (4) Date: Feb. 11, 2014

(87) PCT Pub. No.: WO2012/163904
PCT Pub. Date: Dec. 6, 2012

(65) Prior Publication Data
US 2014/0197255 A1    Jul. 17, 2014

(30) Foreign Application Priority Data
May 30, 2011   (EP) .................................... 11168067

(51) Int. Cl.
*B02C 18/18* (2006.01)
*B02C 18/14* (2006.01)
*B02C 18/22* (2006.01)

(52) U.S. Cl.
CPC .............. *B02C 18/18* (2013.01); *B02C 18/148* (2013.01); *B02C 18/2225* (2013.01)

(58) Field of Classification Search
CPC . B02C 18/18; B02C 18/148; B02C 18/2225; B02C 18/22

USPC ................................. 241/243, 242, 222, 223
See application file for complete search history.

(56) References Cited

U.S. PATENT DOCUMENTS

| 2,812,815 A | 11/1957 | Quinsey et al. |
| 3,244,049 A | 4/1966 | Smith et al. |

(Continued)

FOREIGN PATENT DOCUMENTS

| DE | 2050863 A1 | 8/1971 |
| DE | 2340614 A1 | 3/1975 |
| DE | 20217065 U1 | 1/2003 |

OTHER PUBLICATIONS

International Search Report dated Aug. 24, 2012 issued in PCT/EP2012/060021.

(Continued)

*Primary Examiner* — Faye Francis
(74) *Attorney, Agent, or Firm* — Scully Scott Murphy and Presser

(57) ABSTRACT

A method and apparatus for disintegrating an elastomer is provided. The elastomer is moved across a base relative to a cutting tool and toward the cutting tool. The cutting tool has a cutting wedge, which has a cutting edge and a rake face adjacent to the cutting edge. After the cutting wedge comes into contact with the elastomer, the elastomer is first at least partially compressed only by the rake face between the rake face and the base before the cutting edge cuts through the elastomer. An elastic evasive movement of the elastomer is avoided because of the initial planar compression of the elastomer by the rake face. Thus, it is possible to cut off significantly thinner pieces from the elastomer.

34 Claims, 4 Drawing Sheets

(56) References Cited

U.S. PATENT DOCUMENTS

| | | | |
|---|---|---|---|
| 3,634,570 A | 1/1972 | Himelreich, Jr. et al. | |
| 3,837,586 A * | 9/1974 | Perschbacher | B02C 18/148 198/780 |
| 3,976,254 A | 8/1976 | Hench, Sr. et al. | |
| 4,340,342 A * | 7/1982 | Kim | B26D 1/38 264/118 |
| 4,759,248 A * | 7/1988 | Muller | B02C 18/148 83/349 |
| 5,628,465 A * | 5/1997 | Locker | B02C 18/148 241/34 |
| 5,711,492 A * | 1/1998 | Cheladze | B02C 18/18 241/220 |
| 2014/0263790 A1 * | 9/2014 | Stockmann | B02C 18/148 241/282.1 |

OTHER PUBLICATIONS

International Preliminary Report on Patentability dated Dec. 2, 2013 issued in PCT/EP2012/060021.

* cited by examiner

METHOD FOR DISINTEGRATING AN ELASTOMER AND DISINTEGRATOR

The present invention relates to a method for disintegrating an elastomer and to a disintegrator for disintegrating an elastomer, with the aid of which an elastomeric item, in particular an elastomer strand produced from chloroprene rubber, can be disintegrated into slices that are as thin as possible, in order that the disintegrated elastomer has a surface area that is as large as possible, if for example it is to be dissolved in a solvent, in order for example to produce an adhesive.

It is known to disintegrate an elastomer with the aid of a disintegrator, in which the elastomer is moved with the aid of an advancing device over a base to a cutting tool in the form of a peripheral miller, so that the cutting tool can cut off individual slices from the elastomer with the aid of a cutting wedge. A disadvantage of such a disintegrator and such a method for disintegrating an elastomer is that the elastomer can deform when the cutting wedge is in contact with the elastomer, whereby the elastomer may evade the cutting edge of the cutting wedge. This has the effect that a certain minimum thickness has to be provided for the slices that are cut off, in order that a properly planned disintegration of the elastomer can be achieved at all. In the case of a twisted elastomer strand, a minimum thickness of about 1.8 to 2.2 mm is therefore required.

There is a constant need for disintegrating elastomers into pieces that are as small, and in particular thin, as possible without great effort, in order that for example a specific surface area, that is to say outer area per unit of weight, that is as large as possible can be achieved for subsequent processes. The large specific surface area allows the elastomer to be dissolved quickly in a solvent, in order in particular to produce an elastomer-based adhesive.

It is the object of the invention to provide a method for disintegrating an elastomer and a disintegrator for disintegrating an elastomer with the aid of which the specific surface area can be increased for the disintegrated elastomer, and in particular the layer thickness of chips and/or slices that are cut off can be reduced.

The object is achieved according to the invention by a method for disintegrating an elastomer with the features of claim 1 and a disintegrator for disintegrating an elastomer with the features of claim 12.

In the case of the method according to the invention for disintegrating an elastomer, in particular at least one elastomer strand, the elastomer is moved in relation to a cutting tool over a base toward the cutting tool, the cutting tool having a cutting wedge with a cutting edge and a rake face adjoining the cutting edge. According to the invention, once the cutting wedge comes into contact with the elastomer, the elastomer is initially at least partially compressed only by the rake face between the rake face and the base, before the cutting edge cuts through the elastomer.

The movement of the cutting wedge of the cutting tool takes place in relation to the elastomer in a way that initially avoids linear contact of the cutting edge with the elastomer, and instead there is surface-area contact of the rake face with the elastomer. The surface-area contact of the rake face with the elastomer has the effect that the force of the cutting wedge acting on the elastomer is initially distributed over the relatively large rake face, so that initially a low force per unit area acts on the elastomer in comparison with a linear contact via the cutting edge. This avoids spontaneous evasion of the elastomer. At the same time, the force per unit area gradually increases during the further movement of the cutting wedge, but the larger area causes a higher frictional force between the cutting wedge and the elastomer to be achieved in comparison with a force applied linearly via the cutting edge. The higher friction avoids the possibility that the elastomer can move flexibly away from the cutting wedge due to stretching effects under the increasing loading. Only at a later point in time when the elastomer has been sufficiently compressed by the rake face between the rake face and the base can the cutting wedge roll on the elastomer in such a way that substantially only the cutting edge of the cutting wedge is in contact with the elastomer, whereby part of the elastomer can be cut off by the cutting wedge on account of the high shearing forces at the cutting edge. The cutting off of the elastomer may in this case take place after an initial holding by way of compressing and/or clamping of the elastomer between the rake face and the base by means of wedge cutting or knife cutting, in particular by single-edged wedge cutting on an anvil, it being possible for the single-side wedge cutting edge to be formed by the cutting edge of the cutting wedge and the anvil to be formed by the base. As a result, in a state in which it has elastically flipped up high from the base, the elastomer strand can be captured by the rake face on the flat rear side of the cutting wedge, then be pressed against the base and, in a position in which the elastomer strand can substantially no longer elastically evade it, be cut by rolling of the cutting edge on the partially compressed elastomer strand and moving of the cutting wedge through the elastomer strand in a wedge-like manner. The cutting edge of the cutting wedge may be moved past the base acting as an anvil, a minimum distance s of the cutting wedge from the base being in particular $10\ \mu m \leq s \leq 2$ mm, preferably $50\ \mu m \leq s \leq 1$ mm, more preferably $150\ \mu m \leq s \leq 700\ \mu m$ and particularly preferably $300\ \mu m \leq s \leq 500\ \mu m$. During the movement of the cutting wedge past the base, the cutting edge is in particular not substantially parallel to the surface of the base but angled in relation to the surface of the base, so that an angle bisector taken through the cutting edge is angled with respect to the surface of the base preferably by an angle $\alpha$ of $15° \leq \alpha \leq 90°$, in particular $30° \leq \alpha \leq 60°$, more preferably $40° \leq \alpha \leq 55°$ and particularly preferably $45° \leq \alpha \leq 50°$. The cutting off of the elastomer, for example by single-edged wedge cutting, takes place in this case by means of one cutting edge, and consequently without an opposing edge, whereby the maintenance costs for a second cutting edge can be avoided. The fact that evasion of the elastomer can be avoided as a result of the surface-area contact by way of the rake face during the compressing of the elastomer means that it is possible to achieve particularly small layer thicknesses of the pieces that are cut off from the elastomer, whereby a particularly large specific surface area, that is to say outer area per unit weight, is obtained for the disintegrated elastomer. The method is suitable in particular for disintegrating a latex strand of butyl rubber or chloroprene rubber, in order for example to be able to produce a latex-based adhesive. Furthermore, it is possible to disintegrate more than one elastomer strand at the same time, in that for example two or more elastomer strands are fed next to one another to the same cutting wedge of the cutting tool. If two or more elastomer strands are fed in, the disintegration capacity can be increased correspondingly.

The movements of the elastomer and the movement of the cutting wedge are preferably adapted to one another in such a way that slices that are cut off from the elastomer have a thickness t of $t \leq 1.5$ mm, in particular $t \leq 1.2$ mm, preferably $t \leq 1.0$ mm and particularly preferably $t \leq 0.8$ mm. On account of the particularly slender thicknesses of the pieces that are cut off from the elastomer, a correspondingly large specific surface area is obtained for the pieces cut off from the elastomer. The slices that are cut off have in particular a minimum thickness t of t≥0.2 mm, preferably t≥0.4 mm and particularly preferably t≥0.6 mm, in order to facilitate the handling of the slices that are cut off from the elastomer as bulk material.

In a preferred embodiment, the elastomer has a cut end facing the cutting tool, an oscillation between a bottom dead center, assigned to the base, and a top dead center, remote from the base, being imparted to the cut end of the elastomer by the cutting of the cutting tool, and the cutting wedge contacting the elastomer substantially whenever the cut end is substantially at the top dead center. The oscillation of the cut end of the elastomer, in particular the amplitude of the oscillation, may be dependent on the distance of the cut end of the elastomer from the nearest clamping or fixing of the elastomer, for example of a conveying roller. As a result, it may be that the oscillation of the cut end, in particular the amplitude, can be influenced by the arrangement and/or configuration of the roller for the conveyance of the elastomer, for example a roller arranged directly at the cutting tool and/or the cut end being able to bring about a smaller amplitude of the cut end than a roller further away from the cutting tool and/or the cut end. The distance of the roller from the cut end and/or cutting tool is in this case substantially dependent on the diameter of the roller. In particular, the contact of the cutting wedge with the elastomer takes place with respect to the top dead center of the cut end with a phase shift $\phi$ of $\phi \leq \pm 15°$, in particular $\phi \leq \pm 8°$ and particularly preferably $\phi \leq \pm 2°$. The fact that the rake face of the cutting wedge contacts the elastomer substantially at the top dead center of the imparted up and down oscillation means that initially only small forces are exerted by the rake face on the elastomer, avoiding evasion of the elastomer. Compressing of the elastomer only takes place to a comparatively slight extent, if at all. As soon as the elastomer comes into contact with the base at the bottom dead center, an abutment, acting for example as an anvil against which the elastomer can be pressed by the cutting wedge in order to compress the elastomer, is formed by the base. The compressing of the elastomer and the cutting of the elastomer can then take place in a particularly short time period, so that substantially no blockages and/or longitudinal oscillations occur even with a continuously fed elastomer. Since the actual cutting only takes place in a particularly short time interval, a straight uniform cut is obtained. This makes it possible to produce the slices that are cut off from the elastomer with a uniform consistent quality over a relatively long time period. This makes it easier to maintain required product qualities with respect to the specific surface area of the pieces that are cut off from the elastomer at low cost.

Preferably, an angle $\alpha$ between the rake face and the base at the point in time of the beginning of the contact of the cutting wedge and the elastomer is $15° \leq \alpha \leq 40°$, in particular $20° \leq \alpha \leq 35°$ and preferably $25° \leq \alpha \leq 30°$. With such an angle $\alpha$, a substantially parallel alignment of the rake face with the contacted surface of the elastomer is obtained when the rake face first comes into contact with the elastomer. This takes into account in particular the fact that, on account of its own elasticity, the elastomer has sprung up from the base after a prior cutting operation. If the cutting tool is operated in a rotary manner, the center point of the rotary movement can be chosen particularly easily such that a rolling movement of the cutting wedge on the elastomer causes the cutting edge to be in substantially exclusive contact with the elastomer exactly at the intended beginning of the actual cutting process.

The cutting of the elastomer with the aid of the cutting edge preferably commences at a pressure p below a pressure $p_k$ for the beginning of strain crystallizations of the elastomer, where in particular $0.20 \leq p/p_k \leq 0.95$, preferably $0.50 \leq p/p_k \leq 0.90$, more preferably $0.6 \leq p/p_k \leq 0.85$ and particularly preferably $0.7 \leq p/p_k \leq 0.80$. As a result, a strain crystallization of the elastomer that could change the product properties of the pieces that are cut off is reliably avoided. At the same time, it is possible to compress the elastomer with the aid of the rigid rake face to a pressure just below the strain crystallization, which makes a particularly high frictional force possible and also prevents an elastic evasive movement of the elastomer in the case of particularly small layer thicknesses. This makes it possible in the actual cutting process for particularly slender slices to be cut off cleanly from the elastomer with the aid of the cutting edge of the cutting wedge.

The rake face of the cutting wedge comes into contact with the elastomer particularly preferably on a peripheral surface of the elastomer. Contact of the cutting wedge with an end face of the elastomer facing the cutting tool is thereby avoided. This ensures that the chips that are cut off from the elastomer are substantially pieces in the form of slices with a constant layer thickness and no irregularly cut-off corners.

In particular, the cutting edges of two successive cutting wedges are at a distance D, where, with respect to an effective diameter d of the elastomer, the distance D is $1.0 \leq D/d \leq 8.0$, in particular $1.5 \leq D/d \leq 6.0$, preferably $2.0 \leq D/d \leq 4.0$ and particularly preferably $D/d = 3.0 \pm 0.5$. This ensures that, with a moderate advancing rate for the elastomer in relation to the cutting tool, sufficient material of the elastomer gets between the cutting edges of two successive cutting wedges in order to make a clean cut possible. At the same time, it is possible to provide a sufficiently large space between two successive cutting wedges to be able to transport away from the elastomer the piece that is cut off from the elastomer. It may in this case be possible for the advancing rate of the elastomer to be synchronized with the rotational speed of for example a rotating cutting tool in dependence on the material properties of the elastomer, in particular the elasticity.

In particular, the cutting edge of the cutting wedge has a circumferential speed v of $1.0$ m/s$\leq v \leq 50.0$ m/s, in particular $10.0$ m/s$\leq v \leq 35.0$ m/s, preferably $20.0$ m/s$\leq v \leq 30.0$ m/s and particularly preferably $25.0$ m/s$\leq v \leq 27.0$ m/s. The circumferential speed corresponds substantially to the cutting speed when cutting a piece from the elastomer and is chosen such that, while taking into account the elasticity of the elastomer, cutting of the elastomer can take place without any major problems. On account of the elasticity of the elastomer, the elastomer has a recovery, measured in accordance with DIN 53518, of in particular $\leq 30\%$, preferably $\leq 25\%$, more preferably $\leq 20\%$ and particularly preferably $\leq 15\%$.

Particularly preferably, the cutting tool rotates about a center point, the center point being offset in relation to a center line of the elastomer substantially perpendicularly to the direction of movement of the elastomer by a distance s, where in particular the distance s with respect to the effective diameter d of the elastomer is $0.4 \leq s/d \leq 1.0$, preferably $0.45 \leq s/d \leq 0.6$ and particularly preferably $0.5 \leq s/d \leq 0.55$. The fact that the center point of the rotating cutting tool is arranged off-center in relation to the elastomer, in particular of a twisted elastomer strand of chloroprene rubber, means that it is easier to achieve the effect that the cutting wedge exerts a force on the elastomer initially only with its rake face and only later with a cutting edge. The cutting tool is in particular offset by the distance s counter to the direction of gravitational force. This creates additional space below the cutting tool in the direction of gravitational force to allow the pieces that are cut off from the elastomer to be transported away from the elastomer.

The rake face is preferably inclined in the circumferential direction by an angle β in relation to a radius of the cutting tool running through the cutting edge, where in particular 20°≤β≤40°, preferably 25°≤β≤35° and particularly preferably β=30°±2.5°. The inclination of the rake face allows a suitable rolling movement of the cutting wedge on the elastomer to be set.

Particularly preferably, an elastomer film, in particular chloroprene rubber, is twisted into a strand before the cutting. The twisting of the elastomer film provides the resultant strand with sufficiently high strength in order that individual pieces can be cut off from the strand.

The invention also relates to a disintegrator for disintegrating an elastomer, in particular an elastomer strand, which is suitable in particular for carrying out the method described above. The disintegrator has a cutting tool for cutting off slices from the elastomer, the cutting unit having a cutting wedge with a cutting edge and a rake face adjoining the cutting edge. The disintegrator also has an advancing device for moving the elastomer over a base toward the cutting unit. According to the invention, the advancement of the advancing device and the geometry of the cutting tool are made to match one another in such a way that, once the cutting wedge comes into contact with the elastomer, the elastomer is initially at least partially compressed only by the rake face between the rake face and the base, before the cutting edge cuts through the elastomer. The base may take the form of a fixed mounting on one side, for example in the form of a sliding plate, for the feeding of the elastomer. For example in the case of single-edged wedge cutting of the elastomer by the cutting edge of the cutting wedge, the base may be formed as an anvil. The fact that the elastomer is initially compressed by way of the rake face, which has a larger surface area in comparison with the cutting edge, means that an elastic evasive movement of the elastomer is avoided, so that particularly thin slices can be cut off from the elastomer and a particularly large specific surface area is obtained for the pieces that are cut off from the elastomer. In particular, the advantages that can be achieved on the basis of the method described above can be achieved with the aid of the disintegrator. The disintegrator may in particular be formed and developed in the way described above on the basis of the method. The disintegrator is suitable in particular for disintegrating a latex strand of butyl rubber or chloroprene rubber, in order for example to be able to produce a latex-based adhesive.

In particular, the position of the cutting tool in relation to the base can be set with the aid of at least one adjusting device. With the aid of the adjusting device, the position of the cutting tool in the vertical direction and/or horizontal direction can be set in particular, whereby it is possible to adapt the compressing and cutting movement of the cutting wedge in dependence on the elasticity and effective diameter of the elastomer. The adjusting device may for example have a fastening plate which is connected to the base and/or to the cutting tool and has at least one slot, so that, with the aid of screws, the base and/or the cutting tool can be fixed in various positions in a way corresponding to the configuration of the slot.

Particularly preferably, the cutting tool is rotatably mounted and in particular provided with exchangeable cutting wedges. The cutting wedges may for example be configured as exchangeable inserts, which can be quickly exchanged and can be detachably connected to the cutting tool. The cutting wedges may in particular be exchangeably screwed to the cutting tool.

The invention also relates to an elastomer slice which can be produced from chloroprene rubber and has a thickness t of t≤1.5 mm, in particular t≤1.2 mm, preferably t≤1.0 mm and particularly preferably t≤0.8 mm. The particularly slender thickness t produces a correspondingly large specific surface area for the elastomer slice, which can for example facilitate and accelerate dissolution of the elastomer slice in a solvent, in particular for the production of an adhesive. The elastomer slice has in particular a minimum thickness t of t≥0.2 mm, preferably t≥0.4 mm and particularly preferably t≥0.6 mm, in order to facilitate the handling of the elastomer slice as bulk material. The elastomer slice can preferably be produced by the method described above. In particular, the elastomer slice can be produced with the aid of the disintegrator described above. The elastomer slice may in particular be formed and developed in the way described above on the basis of the method and the disintegrator. In particular, the elastomer slice that can be produced from a twisted strand of chloroprene rubber has a density ρ of ρ=1.23 g/cm$^3$±0.02 g/cm$^3$.

The elastomer slice is in particular formed as a substantially circular-cylindrical slice, the elastomer slice having in particular a diameter d of 1.0 cm≤d≤10.0 cm, preferably 2.0 cm≤d≤7.0 cm, more preferably 2.5 cm≤d≤4.0 cm and particularly preferably d=3.0 cm±0.3 cm.

In the case of a thickness t=1.0 mm, the elastomer slice preferably has a mass-related specific surface area $S_m$ of $S_m$=1.73 m$^2$/kg±0.2 m$^2$/kg. In the case of a thickness t=2.0 mm, a corresponding elastomer slice may have a mass-related specific surface area $S_m$ of $S_m$=0.92 m$^2$/kg. In the case of a thickness t=4.0 mm, a corresponding elastomer slice may have a mass-related specific surface area $S_m$ of $S_m$=0.51 m$^2$/kg, while a corresponding elastomer slice with a thickness of t=8.0 mm would merely have a mass-related specific surface area $S_m$ of $S_m$=0.31 m$^2$/kg. In comparison with an elastomer slice with a thickness of t=4.0 mm, the mass-related specific surface area $S_m$ of the elastomer slice according to the invention in the case of a thickness of t=1.0 mm is in any case about 3.4 times greater and, in comparison with an elastomer slice with a thickness of t=8.0 mm, the mass-related specific surface area $S_m$ of the elastomer slice according to the invention in the case of a thickness of t=1.0 mm is even about 5.5 times greater. The mass-related specific surface area $S_m$ is determined in particular according to DIN ISO 9277:2003-05 Determination of the specific surface area of solids by gas adsorption using the BET method (ISO 9277:1995).

The invention is explained in more detail below with reference to the appended drawings on the basis of a preferred exemplary embodiment.

Figure 1:
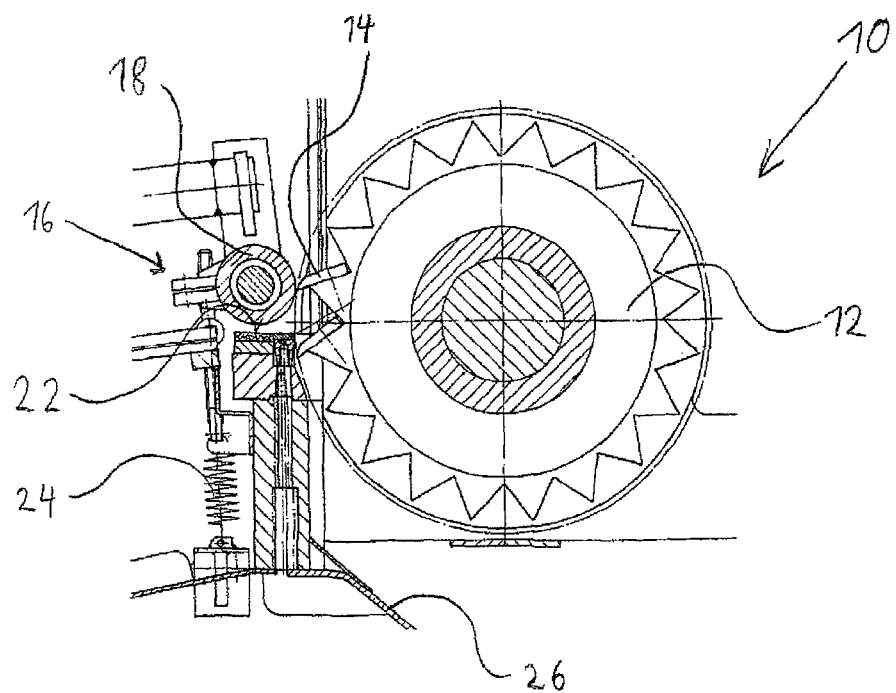
FIG. 1 shows a schematic sectional view of a disintegrator.

The disintegrator 10 that is partially represented in FIG. 1 has a rotating cutting tool 12, to the circumference of which multiple cutting wedges 14 in the form of exchangeable inserts are attached. With the aid of an advancing device 16, an elastomer 20 (not represented) can be moved by way of an advancing element in the form of a driven roller 18 over a base 22 toward the cutting tool 12. The roller 18 may have in particular radially outwardly protruding teeth, which can press themselves somewhat into the elastomer to be disintegrated, in order that the elastomer does not unintentionally slip backward during the disintegration. The base 22 can be adjusted in height with the aid of screwed connections 24. The pieces that are cut off from the elastomer 20 may be directed by way of a ramp 26, for example to a collecting container (not represented).

Figure 2:
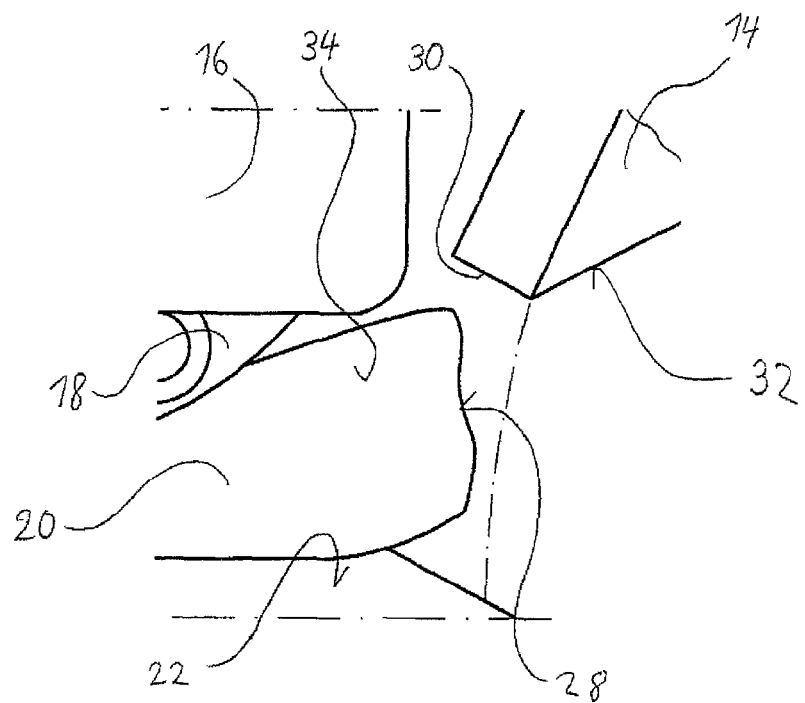
FIG. 2 shows a schematic view of a detail of the disintegrator from FIG. 1 in a first position.
Figure 3:
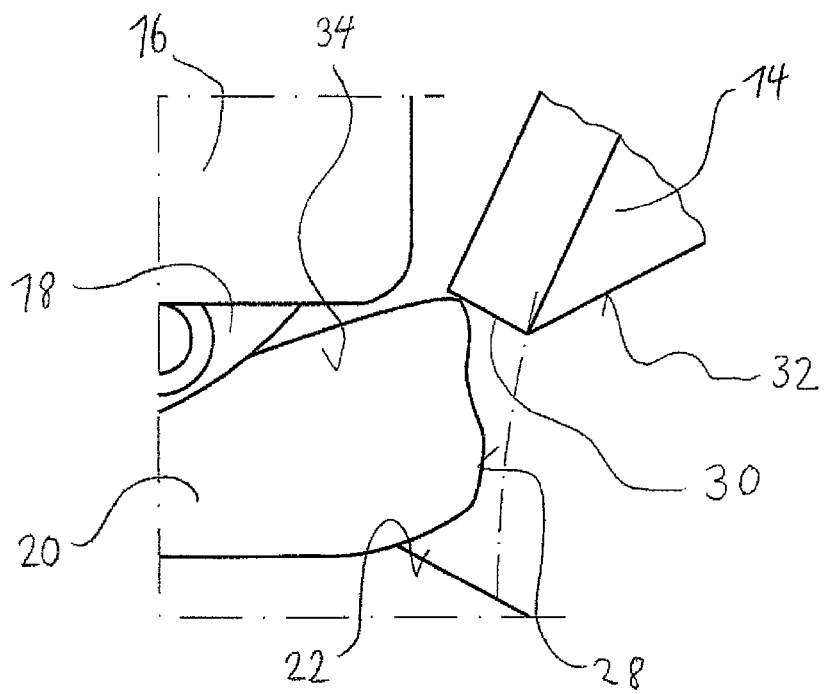
FIG. 3 shows a schematic view of a detail of the disintegrator from FIG. 1 in a second position.
Figure 4:
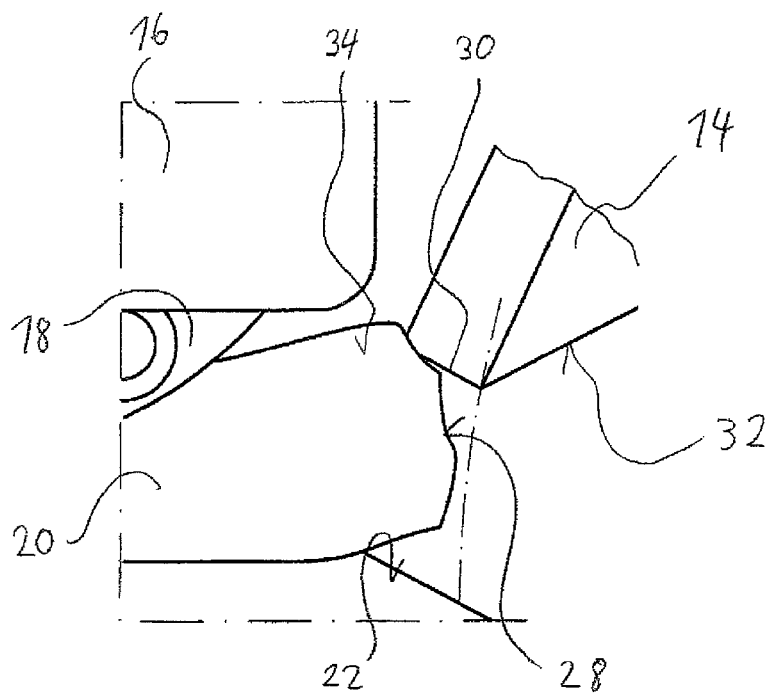
FIG. 4 shows a schematic view of a detail of the disintegrator from FIG. 1 in a third position.
Figure 5:
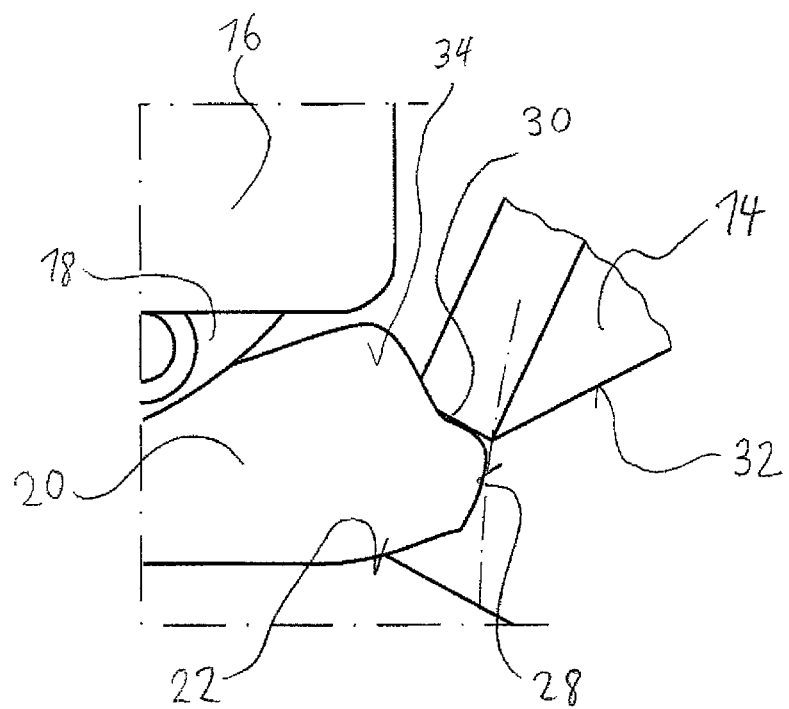
FIG. 5 shows a schematic view of a detail of the disintegrator from FIG. 1 in a fourth position.
Figure 6:
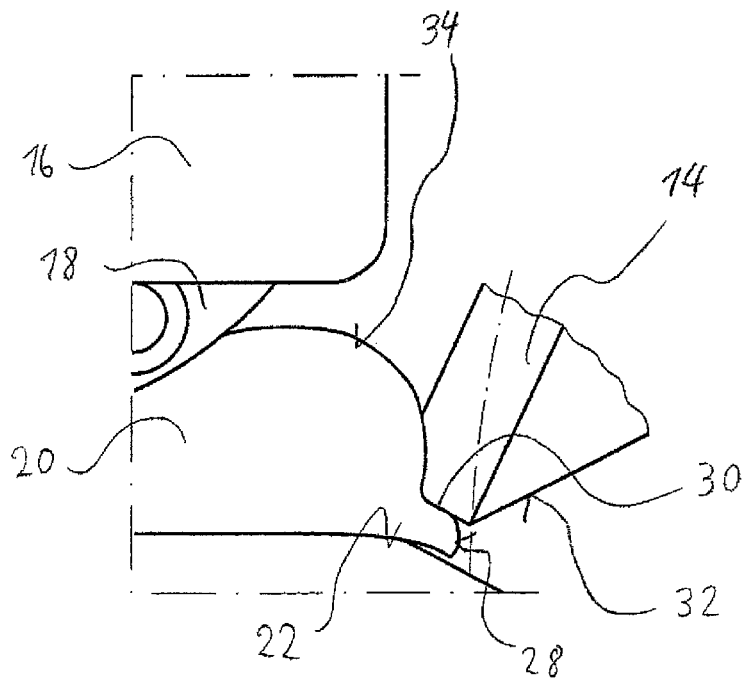
FIG. 6 shows a schematic view of a detail of the disintegrator from FIG. 1 in a fifth position.
Figure 7:
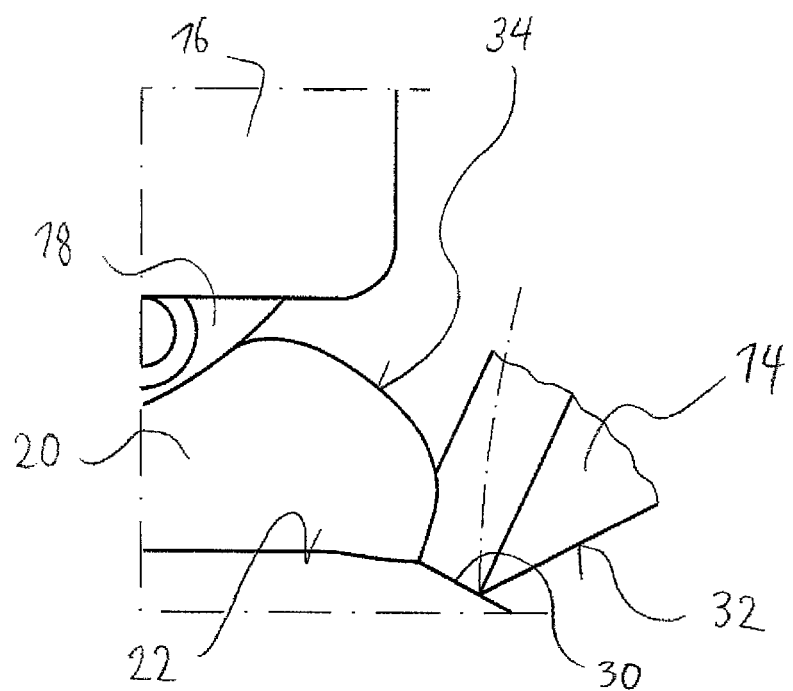
FIG. 7 shows a schematic view of a detail of the disintegrator from FIG. 1 in a sixth position.

As represented in FIG. 2, at the beginning of the cutting operation, a cut end 28 of the elastomer 20 facing the cutting tool 12 is located at a top dead center, which is located substantially at the maximum distance away from the base 22. A rake face 32 of the cutting wedge 20 adjoining a cutting edge 30 is substantially parallel to a peripheral surface 34 of the elastomer 20 in the upper region of the cut end 28. As represented in FIG. 3, the rake face 32 makes substantially surface area contact with the peripheral surface 34 of the elastomer 20 located at the top dead center. As represented in FIG. 4, the elastomer 20 is pressed by the rake face 32 of the cutting wedge 40 downward onto the base 20. As represented in FIG. 5, in this case the elastomer 20 may be already compressed. As represented in FIG. 6, at the moment when the compressed elastomer 20 arrives at the base 22, substantially only the cutting edge 30 can be in contact with the elastomer 20. As represented in FIG. 7, after that the actual cutting takes place, by which a piece in the form of a slice is cut off from the elastomer 20. Since the elastomer is continuously replenished by the advancing device 16, in the situation represented in FIG. 7 the elastomer may already be pressing with its peripheral surface against the cutting wedge 14 with some force and, after the cutting off of the piece in the form of a slice, spring upward until the cut end 28 has again reached the top dead center. The next cutting wedge 14 can subsequently repeat the cutting process that is represented in FIGS. 2 to 7.

The invention claimed is:

1. A method for disintegrating an elastomer, comprising:
moving the elastomer in relation to a cutting tool over a base toward the cutting tool, wherein the cutting tool comprises a cutting wedge with a cutting edge and a rake face adjoining the cutting edge, and
once the cutting wedge comes into contact with the elastomer, initially at least partially compressing the elastomer only by the rake face between the rake face and the base, before the cutting edge cuts through the elastomer,
wherein in a state in which the elastomer has elastically flipped up from the base, the elastomer is captured by the rake face, subsequently pressed against the base, and in a position in which the elastomer no longer elastically evades the cutting edge, cut by rolling the cutting edge on the at least partially compressed elastomer and moving the cutting wedge through the elastomer in a wedge-like manner.

2. The method as claimed in claim 1, wherein the movement of the elastomer and the movement of the cutting wedge are adapted to one another in such a way that slices that are cut off from the elastomer have a thickness t of t≤1.5 mm.

3. The method according to claim 2, wherein said slices that are cut off from the elastomer have a thickness t of t≤1.2 mm.

4. The method according to claim 2, wherein said slices that are cut off from the elastomer have a thickness t of t≤1.0 mm.

5. The method according to claim 2, wherein said slices that are cut off from the elastomer have a thickness t of t≤0.8 mm.

6. The method as claimed in claim 1,
wherein the elastomer has a cut end facing the cutting tool,
further comprising:
effecting an oscillation between a bottom dead center that is associated with the base and a top dead center that is remote from the base, to the cut end of the elastomer by the cutting of the cutting tool, and
the cutting wedge substantially contacting the elastomer whenever the cut end is substantially at the top dead center, the contact of the cutting wedge with the elastomer taking place with respect to the top dead center of the cut end with a phase shift $\phi$ of $\phi \pm 15°$.

7. The method according to claim 6, wherein said phase shift meets the requirement of $\phi \leq \pm 8°$.

8. The method according to claim 6, wherein said phase shift meets the requirement of $\phi \leq \pm 2°$.

9. The method as claimed in claim 1, wherein an angle $\alpha$ between the rake face and the base at a point when the cutting wedge and the elastomer begin contacting each other is $15° \leq \alpha \leq 40°$.

10. The method according to claim 9, wherein said angle $\alpha$ is $20° \leq \alpha \leq 35°$.

11. The method according to claim 10, wherein said angle $\alpha$ is $25° \leq \alpha \leq 30°$.

12. The method as claimed in claim 1, wherein the cutting of the elastomer with the aid of the cutting edge commences at a pressure p below a pressure $p_k$ for the beginning of strain crystallization of the elastomer, where $0.20 \leq p/p_k \leq 0.95$.

13. The method as claimed in claim 1, wherein the rake face of the cutting wedge comes into contact with the elastomer on a peripheral surface of the elastomer.

14. The method as claimed in claim 1, wherein cutting edges of two successive cutting wedges are at a distance D, wherein with respect to the effective diameter d of the elastomer, the distance D is $1.0 \leq D/d \leq 8.0$.

15. The method according to claim 14, wherein the distance D, with respect to the effective diameter d of the elastomer, is $1.5 \leq D/d \leq 6.0$.

16. The method according to claim 14, wherein the distance D, with respect to the effective diameter d of the elastomer, is $2.0 \leq D/d \leq 4.0$.

17. The method according to claim 14, wherein the distance D, with respect to the effective diameter d of the elastomer, is $1.5 \leq D/d = 3.0 \pm 0.5$.

18. The method as claimed in claim 1, wherein the cutting edge of the cutting wedge has a circumferential speed v of $1.0$ m/s $\leq v \leq 50.0$ m/s.

19. The method according to claim 18, wherein said circumferential speed v is $10.0$ m/s $\leq v \leq 35.0$ m/s.

20. The method according to claim 18, wherein said circumferential speed v is $20.0$ m/s $\leq v \leq 30.0$ m/s.

21. The method according to claim 18, wherein said circumferential speed v is $25.0$ m/s $\leq v \leq 27.0$ m/s.

22. The method as claimed in claim 1, wherein the cutting tool rotates about a center point, the center point being offset in relation to a center line of the elastomer substantially perpendicularly to the direction of movement of the elastomer by a distance s, wherein the distance s with respect to the effective diameter d of the elastomer is 0.4≤s/d≤1.0.

23. The method according to claim 22, wherein said distance s with respect to the effective diameter d of the elastomer is 0.45≤s/d≤0.6.

24. The method according to claim 22, wherein said distance s with respect to the effective diameter d of the elastomer is 0.5≤s/d≤0.55.

25. The method as claimed in claim 1, wherein the rake face is inclined in the circumferential direction by an angle β in relation to a radius of the cutting tool running through the cutting edge, where 20°≤β≤40°.

26. The method according to claim 25, wherein said angle β is 25°≤β≤35°.

27. The method according to claim 25, wherein said angle β is 30°±2.5°.

28. The method according to claim 1 wherein the elastomer is at least one elastomer strand.

29. The method as claimed in claim 28, wherein the strand is formed by twisting an elastomer film before the cutting.

30. The method according to claim 29, wherein said elastomer film is chloroprene rubber.

31. The method according to claim 1, wherein the cutting of the elastomer with the aid of the cutting edge commences at a pressure p below a pressure $p_k$ for the beginning of strain crystallization of the elastomer, wherein $0.50 \leq p/p_k \leq 0.90$.

32. The method according to claim 1, wherein the cutting of the elastomer with the aid of the cutting edge commences at a pressure p below a pressure $p_k$ for the beginning of strain crystallization of the elastomer, wherein $0.6 \leq p/p_k \leq 0.85$.

33. The method according to claim 1, wherein the cutting of the elastomer with the aid of the cutting edge commences at a pressure p below a pressure $p_k$ for the beginning of strain crystallization of the elastomer, wherein $0.7 \leq p/p_k \leq 0.80$.

34. A disintegrator for disintegrating an elastomer, comprising:

a cutting tool for cutting off slices from the elastomer, the cutting tool comprising a cutting wedge with a cutting edge and a rake face adjoining the cutting edge, and an advancing device for moving the elastomer over a base toward the cutting tool, wherein the advancing device and the cutting tool are configured to permit the advancement of the advancing device and the geometry of the cutting tool to match one another in such a way that, once the cutting wedge comes into contact with the elastomer, the elastomer is initially at least partially compressed only by the rake face between the rake face and the base, before the cutting edge cuts through the elastomer, wherein in a state in which the elastomer has elastically flipped up from the base, the elastomer is captured by the rake face, subsequently pressed against the base, and in a position in which the elastomer no longer elastically evades the cutting edge, cut by rolling the cutting edge on the at least partially compressed elastomer and moving the cutting wedge through the elastomer in a wedge-like manner.

* * * * *